US012636628B2

(12) United States Patent
Wilson

(10) Patent No.: US 12,636,628 B2
(45) Date of Patent: May 26, 2026

(54) ELECTRICALLY DRIVEN OILFIELD BLENDER SYSTEM

(71) Applicant: Twin Disc, Inc., Racine, WI (US)

(72) Inventor: Edwin E. Wilson, Colleyville, TX (US)

(73) Assignee: Twin Disc, Inc., Racine, WI (US)

( * ) Notice: Subject to any disclaimer, the term of this patent is extended or adjusted under 35 U.S.C. 154(b) by 964 days.

(21) Appl. No.: 17/534,602

(22) Filed: Nov. 24, 2021

(65) Prior Publication Data

US 2022/0161212 A1 May 26, 2022

Related U.S. Application Data

(60) Provisional application No. 63/118,119, filed on Nov. 25, 2020.

(51) Int. Cl.

*B01F 35/32* (2022.01)
*B01F 23/50* (2022.01)
*B01F 23/53* (2022.01)
*B01F 27/90* (2022.01)
*B01F 35/33* (2022.01)
*B01F 35/71* (2022.01)

(Continued)

(52) U.S. Cl.

CPC .......... *B01F 35/3204* (2022.01); *B01F 23/51* (2022.01); *B01F 23/53* (2022.01); *B01F 23/59* (2022.01); *B01F 27/90* (2022.01); *B01F 35/32045* (2022.01); *B01F 35/331* (2022.01); *B01F 35/7176* (2022.01); *B01F 35/71775* (2022.01); *B01F 35/7544* (2022.01); *E21B 43/2607* (2020.05); *B01F 2101/49* (2022.01)

(58) Field of Classification Search

CPC .......................... B01F 2101/49; E21B 43/2607

See application file for complete search history.

(56) References Cited

U.S. PATENT DOCUMENTS 4,311,395 A * 1/1982 Douthitt ................ B62D 53/06 366/27
4,707,644 A * 11/1987 Miller ...................... H02P 1/02 318/136

(Continued)

FOREIGN PATENT DOCUMENTS

CN 101702602 A * 5/2010
WO 2020214934 10/2020

OTHER PUBLICATIONS

Multicomp. (2018). Direct-On-Lin (DOL) Motor Starter. https://www.farnell.com/datasheets/2602750.pdf. (Year: 2018).*

*Primary Examiner* — Claire X Wang
*Assistant Examiner* — Patrick M Mccarty
(74) *Attorney, Agent, or Firm* — Boyle Fredrickson, S.C.

(57) ABSTRACT

An electrically driven oilfield blender system is configured to utilize electric motors as electric prime movers to prepare frac slurry and move the frac slurry to an oilfield pressure pumping system or pressure pumper that pumps the frac slurry into a subterranean formation. Each of the prime mover electric motors may operate at a fixed or constant rated speed and may be connected to a transmission that can drive a device such as a feed pump for a mixing tub or an auxiliary device at a variable speed. An electro-hydraulic motor start system includes an electric motor that powers a hydraulic pump. The hydraulic pump drives hydraulic motors that pre-rotate the prime mover electric motors to their rated speeds before they are energized.

11 Claims, 3 Drawing Sheets

(51) Int. Cl.

| | |
|---|---|
| ***B01F 35/75*** | (2022.01) |
| ***E21B 43/26*** | (2006.01) |
| *B01F 101/49* | (2022.01) |

(56) References Cited

U.S. PATENT DOCUMENTS

| | | | | |
|---|---|---|---|---|
| 7,649,286 | B2 * | 1/2010 | Manning | F04D 25/04 310/83 |
| 10,221,856 | B2 | 3/2019 | Hernandez et al. | |
| 11,891,884 | B2 * | 2/2024 | Wilson | F04B 9/10 |
| 2002/0047416 | A1 * | 4/2002 | Oliveira | H02K 7/20 310/112 |
| 2006/0052903 | A1 | 3/2006 | Bassett | |
| 2008/0296909 | A1 * | 12/2008 | DiPasquale, Jr. | H02K 7/118 290/40 R |
| 2014/0158345 | A1 * | 6/2014 | Jang | E21B 43/261 166/305.1 |
| 2014/0318144 | A1 * | 10/2014 | Lazzeri | F01D 21/20 60/801 |
| 2015/0275891 | A1 * | 10/2015 | Chong | F04B 53/147 417/419 |
| 2016/0263983 | A1 * | 9/2016 | Christ | B60K 6/00 |
| 2016/0294265 | A1 * | 10/2016 | Head | H02K 5/132 |
| 2016/0348479 | A1 | 12/2016 | Oehring et al. | |
| 2017/0051732 | A1 * | 2/2017 | Hemandez | F04B 17/06 |
| 2017/0226842 | A1 | 8/2017 | Omont et al. | |
| 2019/0010793 | A1 * | 1/2019 | Hinderliter | H02P 27/047 |
| 2020/0400005 | A1 * | 12/2020 | Han | B01F 35/7176 |
| 2021/0301815 | A1 * | 9/2021 | Chretien | F04B 51/00 |

* cited by examiner

ELECTRICALLY DRIVEN OILFIELD BLENDER SYSTEM

CROSS REFERENCE TO RELATED APPLICATIONS

This application claims the benefit of priority under 35 USC § 119(e) to U.S. Provisional Patent Application No. 63/118,119, filed Nov. 25, 2020, the entire contents of which are hereby expressly incorporated by reference into the present application.

BACKGROUND OF THE INVENTION

Field of the Invention

The preferred embodiments relate generally to the field of hydrocarbon recovery from the earth and, more specifically, to oilfield blender systems used with oilfield pressure pumping systems for fracturing underground formations to enhance recovery of hydrocarbons.

Discussion of the Related Art

Hydraulically fracturing (fracking) subterranean formations with fracking pumps or oilfield pressure pumping systems to enhance flow in oil and gas wells is known. Fracking increases well productivity by increasing the porosity of, and thus flow rate through, production zones that feed boreholes of the wells that remove underground resources like oil and gas.

Fracking operations are evolving over time in order to gain efficiency. This includes increasing fracturing fluid flow rates and shortening duty cycles of fracking operations, sometimes to a nearly continuous duty cycle. In order to keep up with these increasing performance demands, major components or systems within fracking operations, such as blender systems and pressure pumpers, are getting larger and more powerful.

Oilfield blender systems include at least one blender machine or oilfield blender (blender) that mixes various constituents such as fracturing fluid (frac fluid), which may be made from gel(s) and water, and proppant, into a slurry. The slurry is delivered from the blender to the pressure pumper(s), which pumps the slurry into the subterranean formation to fracture it. Recently, some blender(s) within a blending system can be required to mix and supply slurry to multiple pressure pumpers. Some implementations require a single blender to mix and deliver slurry to twelve or more pressure pumpers.

Blenders within fracking operations are typically powered by high powered stationary diesel engines. Lately, the high power and increased demands on blenders can require multiple diesel engines for each blender. High horsepower stationary diesel engines are expensive and require maintenance and operational attention, such as refueling.

Some attempts have been made to use variable speed electric motors as prime movers for some major components or systems within fracking operations, such as to power the pressure pumpers. Such variable speed electric motors include shunt wound, variable speed, DC (direct current) traction motors and variable speed, for example, variable frequency, AC (alternating current) electric motors. Although variable speed electric motors can require less operational attention than high horsepower stationary diesel engines, they are expensive and require sophisticated motor controls.

Although constant speed AC motors are more straightforward than variable speed electric motors, they have not been implemented in fracking operations because they present numerous challenges. The fixed speed(s) of constant speed AC motors do not provide flow rate and pressure control needed in numerous aspects of fracking. For example, different fracking jobs require different pressure pumping rates and correspondingly different blender mixing rates to adequately provide slurry to the pressure pumpers.

Furthermore, constant speed AC motors of high-enough horsepower ratings to power pumpers and blenders are difficult to start because they require extremely high starting currents as in-rush (locked rotor) currents to begin their rotations.

Regardless, as efforts continue toward electrically driven fracking subsystems such as pressure pumpers, it would be beneficial to have electrically driven blenders for consistent prime mover configurations that have common or similar components as well as similar maintenance or inspection requirements with those of other fracking subsystems.

What is therefore needed is a straightforward electrically-powered prime mover for oilfield blenders that can prepare and supply slurry to oilfield pressure pumpers at high flow rates and short or continuous duty cycles.

SUMMARY AND OBJECTS OF THE INVENTION

The preferred embodiments overcome the above-noted drawbacks by providing an electrically driven oilfield blender system to mix a slurry for use with an oilfield pressure pumping system or pressure pumper with a blender that receives power from a constant speed AC motor as a prime mover.

An oilfield blender system is configured to allow a constant speed electric motor(s) to drive various oilfield blender components at variable speeds. This can be incorporated with an electro-hydraulic motor start system that facilitates starting the constant speed AC motor by pre-rotating it to be driven to its rated speed before energizing the constant speed AC motor.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary and, therefore, non-limiting, embodiments illustrated in the drawings accompanying and forming a part of this specification, wherein like reference numerals designate the same elements in the several views, and in which.

Figure 1:
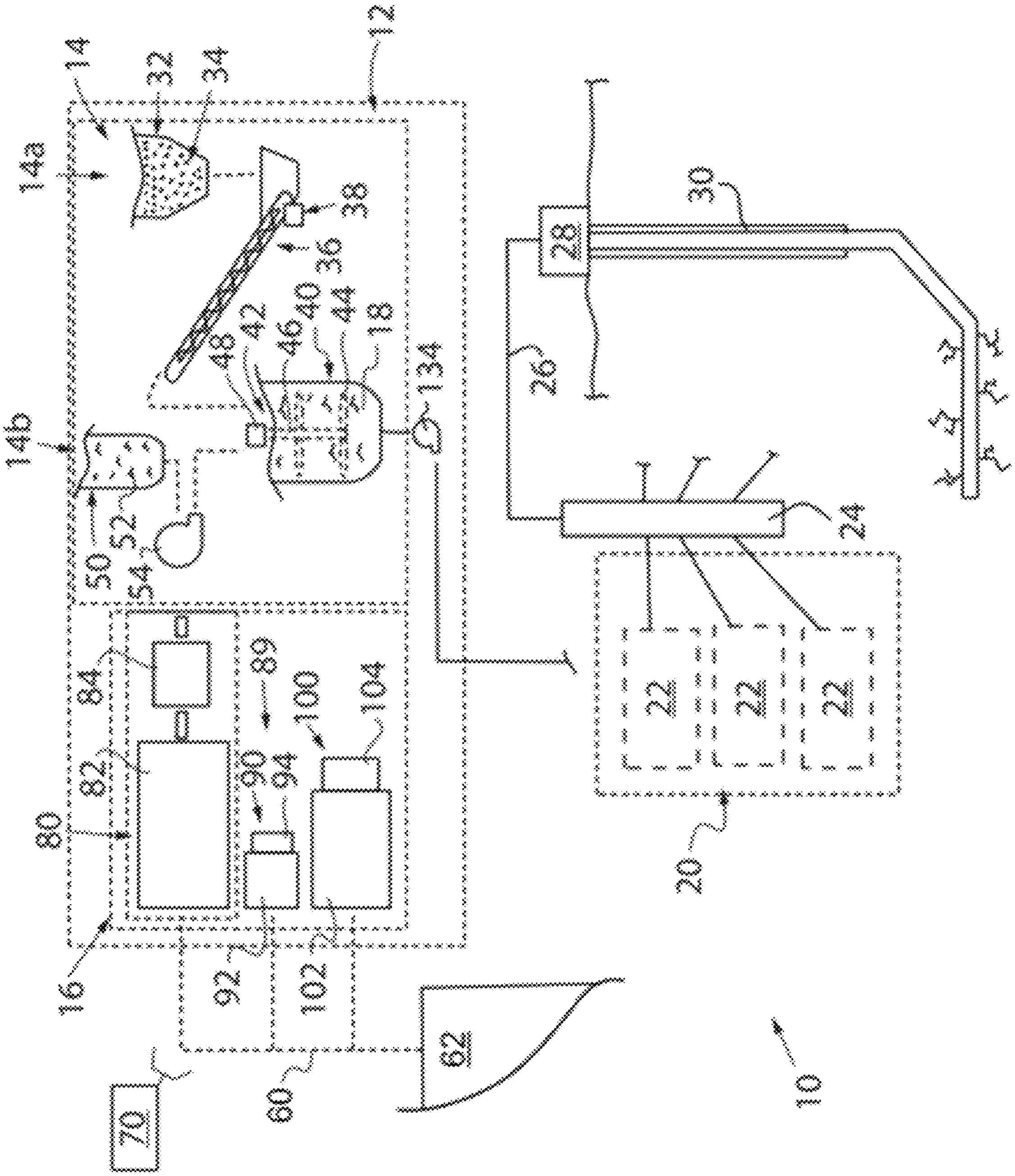
FIG. 1 illustrates a schematic view of a first embodiment of an electrically driven oilfield blender system of the invention in an oilfield site.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, an oilfield site 10 is represented with an embodiment of the invention as an electrically driven oilfield blender system or blender 12 that includes a blender mixing system 14 and a blender drive system 16. Blender mixing system 14 creates a fracturing slurry 18 and blender drive system 16 provides the power used by the blender mixing system 14 to create slurry 18.

Still referring to FIG. 1, after producing slurry 18, blender 12 delivers the slurry 18 to a pressure pumping system 20. Pressure pumping system 20 is shown with multiple pressure pumpers 22, sometimes collectively referred to as a frac spread. Oilfield site 10 is shown here with a single blender 12 that feeds (delivers slurry 18 to) multiple pressure pumpers 22 of the frac spread. However, it is understood that multiple blenders 12 or multiple system components of the blender(s) 12, may be implemented. Typically, oilfield site 10 will have more pressure pumpers 22 than blenders 12, with one or two blenders 12 feeding a number of pressure pumpers 22 that is a multiple of the number of blenders 12. In some implementations, a pair of blenders 12 may feed at least twelve pressure pumpers 22.

Each of the pressure pumpers 22 has a power unit that delivers power to a fracturing (frac) pump. Although the power unit may include a high-powered internal combustion engine of at least of at least 1,000 HP (horsepower), the power unit may instead include a high-powered constant speed AC (alternating current) motor of, for example, at least about 1,000 HP or having an equivalent torque rating of about a 1,000 HP or larger-output diesel engine. The constant speed electric motor of the pressure pumper's 22 power unit may deliver torque through a rotating output shaft to a transmission, for example, a model TA90-7600, available from Twin Disc®, Inc., that is controlled to provide a variable speed input to drive the frac pump from the constant-speed electric motor as its prime mover.

Still referring to FIG. 1, the frac pump of pressure pumper 22 is typically a positive displacement, high-pressure, multi-cylinder pump that can deliver high flow rates and produce high pressures, for example, 10,000 psi (pounds per square inch) or more, typically at least 15,000 psi. Each pressure pumper 22 delivers pressurized slurry 18 to a manifold 24. A manifold outlet line 26 directs the pressurized slurry 18 from manifold 24 to wellhead 28. At the wellhead 28, the slurry 18 is directed to flow through a borehole that extends through a well casing 30 for fracturing the subterranean formation.

Still referring to FIG. 1, blender mixing system 14 has dry and wet additive systems 14*a*, 14*b*, which respectively deliver dry and wet constituents or components for processing that are used to make slurry 18. The processing includes the blender mixing system 14 mixing the dry and wet constituents to together to create the slurry 18. The dry additive system 14*a* includes a storage container(s), shown here as silo 32, that stores a volume of dry proppant, which is typically fracking sand 34. Silo 32 releases sand 34 from its outlet into an inlet hopper or chute of a conveying device, shown as screw conveyor or screw auger 36. Auger 36 includes a screw or spiral auger blade that is rotated by auger drive 38 to deliver sand 34 into an opening at the top or upper end of mixing tub 40. Auger drive 38 typically includes a hydraulic motor that applies torque through a gear train to rotate the spiral auger blade within a cylindrical body or auger tube. A mixing tub agitator 42 includes blades 44 that extend radially from a vertical shaft 46 that is driven to rotate by agitator drive 48. Like auger drive 38, agitator drive 48 typically includes a hydraulic motor.

Still referring to FIG. 1, wet additive system 14*b* also includes a storage container(s), shown as a fracturing fluid storage tank (frac tank) 50 that stores a volume of fracturing fluid (frac fluid) 52. Frac fluid 52 may be a premixed volume of water and gel(s). The premixing of frac fluid 52 can occur at the oilfield site 10, upstream of the frac tank 50. This is typically done by a hydration unit (not shown) that mixes dry gel-forming power with water or mixes a concentrated solution of gel with additional water to provide the desired viscosity of the frac fluid 52 that is delivered to and stored in frac tank 50.

Still referring to FIG. 1, a large pump with a high flow-rate, shown as tub feed pump 54 that is typically implemented as a centrifugal pump (C-pump), delivers the frac fluid 52 from frac tank 50 into the mixing tub 40. In the mixing tub 40, frac fluid 52 is mixed with sand 34 to make the slurry 18. Tub feed pump 54 has a flow rate that can support feeding sufficient material into the mixing tub 40 to make slurry 18 at a sufficient rate. The volume and time period of slurry 18 production in mixing tub 40 allows for delivery of a flow of slurry 18 that adequately supports the use demands of the pressure pumpers 22 in the frac spread of pumping system 20. The flow rate of tub feed pump 54 is typically enough to support an output of blender 12 of at least 100 BPM (barrels per minute) or 4200 GPM (gallons per minute) of slurry 18 to pumping system 20, which can be an output of about 150 BPM or 6300 GPM of slurry 18 to pumping system 20.

Still referring to FIG. 1, blender mixing system 14 is powered by blender drive system 16, which receives electrical power through conductors 60 from electrical power system 62. Electrical power system 62 includes a generator and prime mover such as a combustion engine which may be a gas turbine engine. Control system 70 includes a computer that executes various stored programs while receiving inputs from and sending commands to blender 12 for controlling, for example, energizing and de-energizing various system components within the blender mixing system 14 and blender drive system 16 as well as bringing the pumping system 20 online and controlling it for fracking the subterranean formations. Frac site control system 70 may include the TDEC-501 electronic control system available from Twin Disc®, Inc. for controlling blender 12 and/or other systems or components of the oilfield site 10.

Still referring to FIG. 1, blender drive system 16 is shown with multiple electric motors as prime movers that deliver power for various blender functions, such as mixing and/or conveyance of slurry 18 or its constituents. Blender drive system 16 is shown here with a primary blender drive or blender wet feed drive 80 with a first electric motor of the blender drive system 16. The electric motor of wet feed drive 80 is typically a fixed or constant speed AC motor, shown as wet feed electric motor 82. Wet feed electric motor 82 is a high-powered constant speed motor, for example, about 800 HP (horsepower) or having an equivalent torque rating of about an 800 HP diesel engine. Wet feed electric motor 82 operates at a relatively fast fixed rotational speed, such as a fixed rated speed of about 3,000 RPM (rotations per minute) and is connected and delivers power to a heavy-duty industrial gearbox or transmission, shown as transmission 84.

Transmission 84 may be a planetary or other multi-speed transmission with multiple ranges that provide multiple, typically substantially evenly spaced, drive ratios to facilitate close regulation of rotational speed of the transmission output shaft and, correspondingly, the rate of rotationally driven components or subsystems downstream of wet feed drive 80. Transmission 84 may be, for example, an industrial transmission available from Twin Disc®, Inc., within its product line(s) for land-based energy markets.

Still referring to FIG. 1, electro-hydraulic motor start system 89 includes a motor start drive 90 that defines a second electric motor of blender drive system 16, shown here as start drive electric motor 92. Start drive electric motor is typically a fraction of the size and a fraction of the power rating of wet feed electric motor 82. Start drive electric motor 92 typically has a rating of less than 100 HP and may have a rating that is less than 10% of wet feed electric motor's 82 rating, such as about 60 HP (plus or minus 10%) for implementations of wet feed electric motor 82 that are about 800 HP (plus or minus 10%). Unlike the fixed-speed configuration of wet feed electric motor 82, start drive electric motor 92 is typically implemented as a variable speed AC motor. Start drive electric motor 92 delivers power to the motor start drive's 90 hydraulic pump, shown as start drive pump 94. As explained in greater detail below, the start drive pump 94 pressurizes and selectively delivers hydraulic fluid to wet feed drive 80 and also to auxiliary drive 100.

Still referring to FIG. 1, auxiliary drive 100 defines a third electric motor of blender drive system 16, shown here as auxiliary electric motor 102. Like primary blender feed or wet feed electric motor 82, auxiliary electric motor 102 is substantially larger than start drive electric motor 92. Auxiliary electric motor 102 typically has a smaller power rating than the wet feed electric motor 82, which may be less than about 80% of the wet feed electric motor's power rating. For 800 HP implementations of wet feed electric motor 82, the power rating of auxiliary electric motor 102 may be about 600 HP (plus or minus 10%). Auxiliary motor 102 delivers power to auxiliary drive's 100 hydraulic pump(s), shown as auxiliary pump(s) 104. The auxiliary pump(s) 104 provides hydraulic power that is used to drive various components in blender 12.

Figure 2:
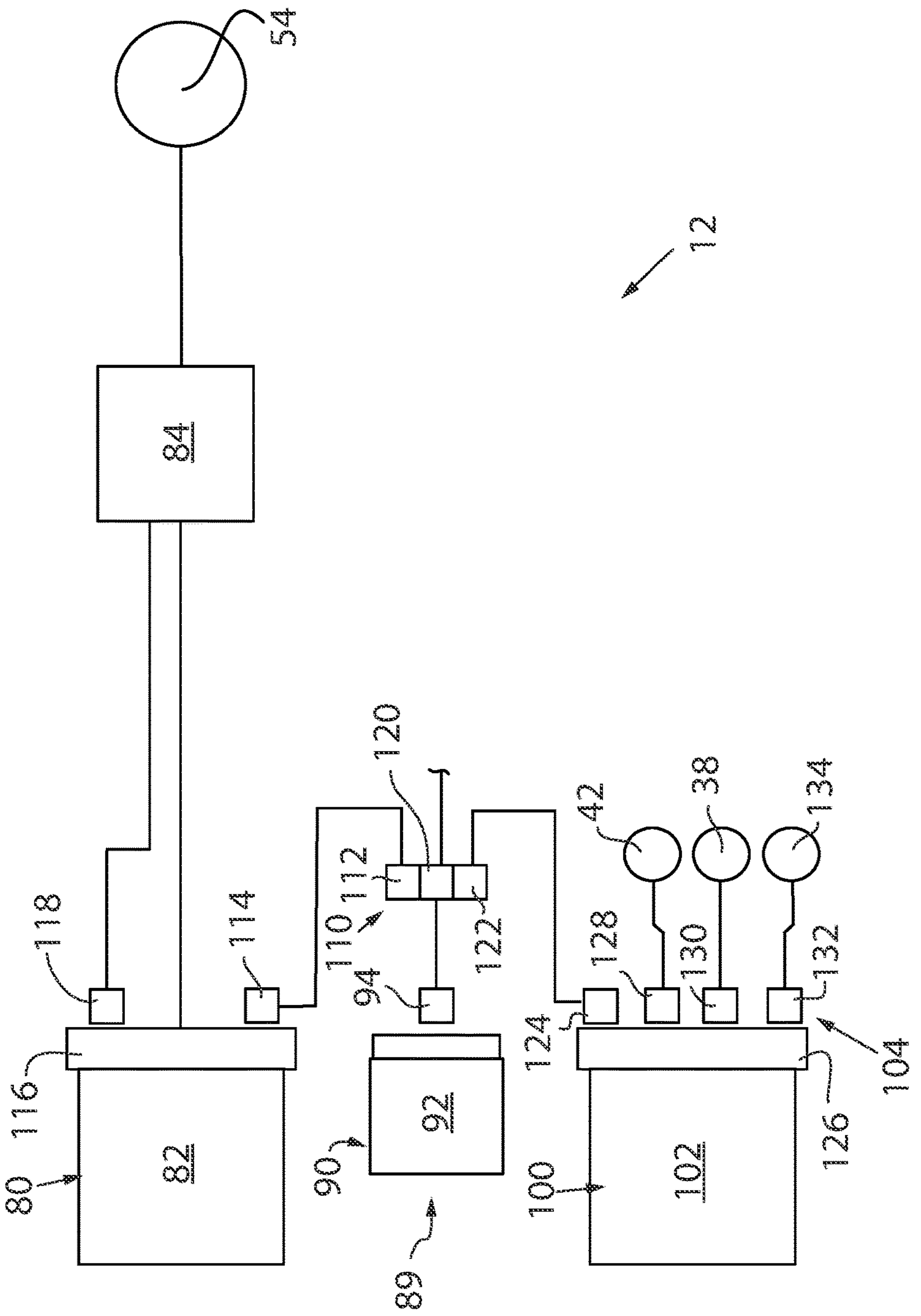
FIG. 2 illustrates a schematic view of a blender of the system of FIG. 1.

Referring now to FIG. 2, start drive electric motor 92 of motor start drive 90 is selectively energized to deliver torque for starting the larger wet feed and auxiliary electric motors 82, 102. When start drive electric motor 92 is energized, its output shaft can rotate an input shaft start drive pump 94. This can be through a continuous coupling or by way of a selectable or clutched coupling between the start drive electric motor 92 and start drive pump 94. A valve assembly or valve block 110 is controlled by control system 70 to selectively direct hydraulic fluid from start drive pump 94 to other components of blender 12 to hydraulically and selectively power them. Valve block 110 may define a mode selector valve that includes at least one actuatable valve(s) that is selectively positioned to direct flow out of different ports to selectively direct hydraulic fluid under pressure from start drive pump 94 along different flow paths to different downstream components. The actuatable valve(s) may include, for example, a solenoid actuated spool valve that provides multiple discrete positions, show here schematically with three adjacent blocks that represent three discrete positions and/or ports as outlets for the hydraulic fluid.

Still referring to FIG. 2, at a first position of an actuatable valve(s) of valve block 110, port 112 fluidly connects start drive pump 94 to hydraulic start motor 114 of wet feed drive 80. Hydraulic start motor 114 is mounted to an output section 116 of wet feed drive 80, which has an output shaft that delivers torque to an input shaft of transmission 84. Output section 116 may be a separate transmission device that is connected to an output end of the wet feed electric motor 82 or it may be defined by or provided in the output end of the wet feed electric motor 82, itself. When hydraulic start motor 114 is driven to rotate by start drive pump 94, hydraulic start motor 114 rotates a motor shaft (for example, an output shaft or an internal rotor shaft) of wet feed electric motor 82 by way of a gear-train or other geared interaction or cooperating rotation-transmitting components. Hydraulic start motor 114 rotates the motor shaft to bring it sufficiently close to its rated fixed speed or constant synchronous speed (for example, within 10%) before the wet feed electric motor 82 is energized by control system 70. This allows connection of blender feed electric motor 82 to the electrical power source DoL (Direct on Line) while avoiding the motor's high in-rush (locked rotor) current that would otherwise be required to start the wet feed electric motor 82. The wet feed electric motor 82 is therefore able to be started at essentially its normal running current (for example, within 10%), when pre-driven to its synchronous speed by hydraulic start motor 114.

Still referring to FIG. 2, wet feed drive's 80 output section 116 is shown here supporting transmission pump 118. Transmission pump 118 is a hydraulic pump that is driven by wet feed electric motor 82 and provides pressurized hydraulic fluid to transmission 84 for lubrication and clutching/shifting. It is contemplated that start drive pump 94 may provide the pressurized hydraulic fluid to transmission 84 for its lubrication and clutch/shifting actuation through port 120 of valve block 110. It is further contemplated that when the actuatable valve(s) of valve block 110 is in a second position, the valve block 110 may instead provide a neutral condition through port 120 in which pressurized hydraulic fluid is routed back to a sump such as a hydraulic tank or other reservoir without driving any downstream hydraulic components.

Still referring to FIG. 2 and the valve block 110, when at another position such as a third position of the valve block's 110 actuatable valve(s), port 122 fluidly connects start drive pump 94 to hydraulic start motor 124 of auxiliary drive 100. Hydraulic start motor 124 is mounted to an output section 126 of auxiliary drive 100, which has an output shaft that delivers torque to the auxiliary pump(s) 104. Similar to output section 116 of wet feed drive 80, output section 126 of auxiliary drive 100 may be a separate transmission device that is connected to an output end of the auxiliary electric motor 102 or it by be defined by or provided in the output end of the auxiliary electric motor 102. Also similar to the hydraulic start motor 114 of wet feed drive 80, hydraulic start motor 124 is driven to rotate by start drive pump 94 in order to pre-rotate the de-energized auxiliary electric motor 102 of auxiliary drive 100 to bring auxiliary electric motor 102 toward its rated fixed speed or synchronous speed (for example, within 10%) before control system 70 energizes the auxiliary electric motor 102. This allows connecting the auxiliary electric motor 102 to the electrical power source DoL while avoiding the motor's high in-rush (locked rotor) current that is associated with starting a stationary de-energized auxiliary electric motor 102. The auxiliary electric motor 82 is therefore able to be started at essentially its normal running current (for example, within 10%) by hydraulically pre-driving it with hydraulic start motor 124.

Still referring to FIG. 2, output section 126 may be configured as a pump pad or accessory supporting device and is shown here supporting four accessories or devices. Of the four devices in this representation, one of them, the previously discussed hydraulic start motor 124, is an input device that is driven by hydraulic power. The other three devices are shown as output devices, such as auxiliary pump(s) 104, that provide hydraulic power to drive downstream components. The upper most auxiliary pump 104 is shown as agitator pump 128. Agitator pump 128 selectively provides pressurized hydraulic fluid to mixing tub agitator 42 (FIG. 1) to hydraulically power the hydraulic motor of agitator drive 48. The middle auxiliary pump 104 is shown as auger drive pump 130. Auger drive pump 130 selectively provides pressurized hydraulic fluid to auger 36 (FIG. 1) to hydraulically power the hydraulic motor of auger drive 38. The lower auxiliary pump 104 is shown as a C-pump drive pump 132. Drive pump 132 selectively provides pressurized hydraulic fluid to a hydraulic motor that rotates an impeller of a C-pump or other pump as a pumping system feed pump 134 to pump the slurry 18 from blender 12 to pumping system 20 (FIG. 1).

Figure 3:
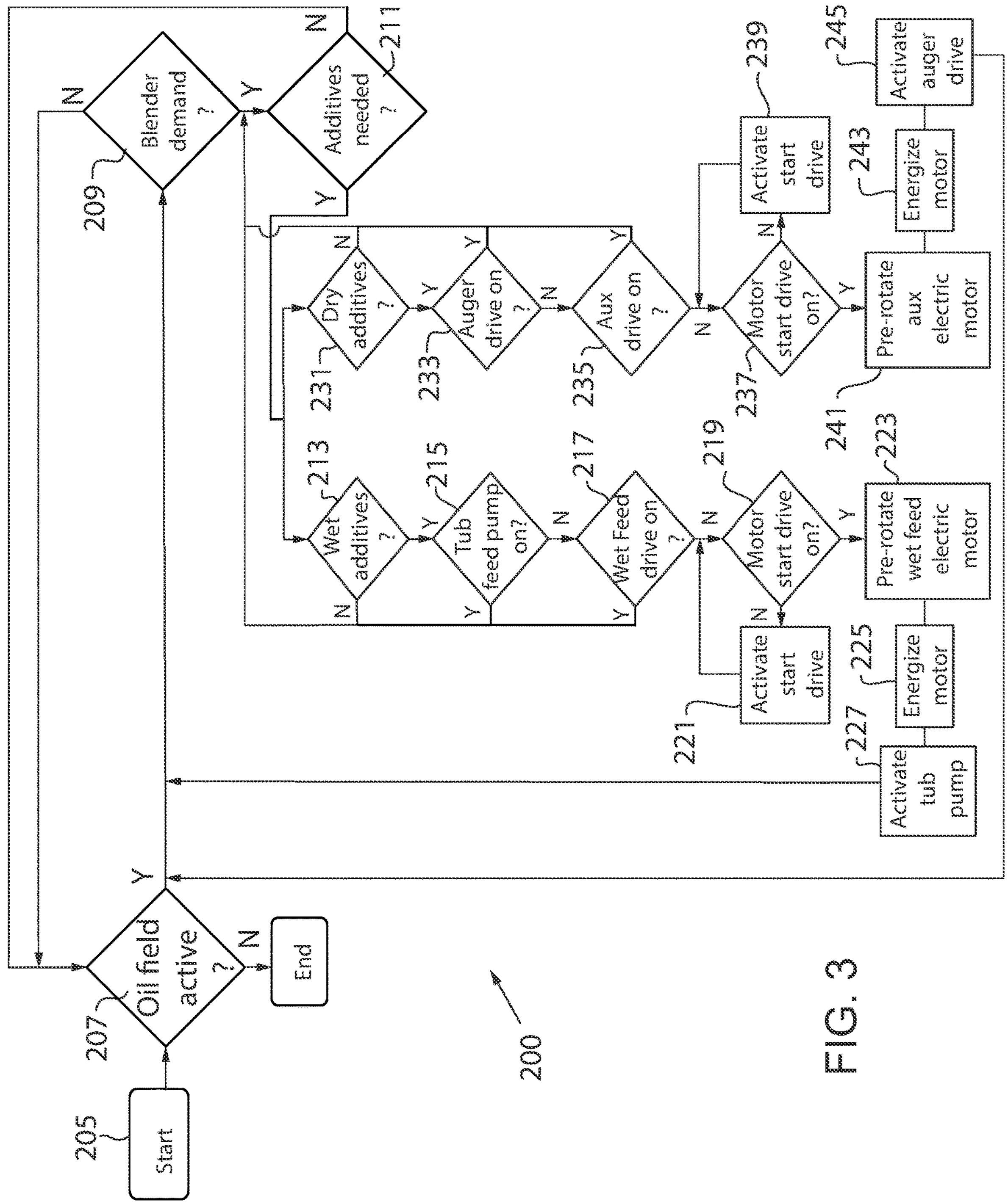
FIG. 3 illustrates a flow diagram of a method of implementing the system of FIG. 1.

Referring now to FIG. 3 and with background reference to FIGS. 1-2 showing various subsystems and components, an example of a use methodology is shown as process 200 of using blender 12. Process 200 starts at block 205 and, if the oilfield site 10 is active at block 207, the control system 70 determines if there is a demand for blender 12 use at block 209. As represented at block 211, during periods of blender 12 demand, control system 70 determines if additives are needed, such as constituents to deliver to tub 40. When wet additives such as frac fluid 52 are needed at block 213 for making slurry 18, control system determines if tub feed pump 54 is on or activated and therefore pumping the frac fluid 52 into tub 40 at block 215. Block 217 shows that if the tub feed pump 54 is not on, then control system 70 determines if wet feed drive 80 is on or activated and therefore able to power the tub feed pump 54. When the wet feed drive 80 is not activated with wet feed electric motor 82 de-energized, then control system 70 determines if motor start drive 90 is activated at block 219 and, if not, activates the motor start drive 90 at block 221 by energizing the start drive electric motor 92.

At block 223, control system 70 commands pre-rotation of wet feed electric motor 82. This includes directing hydraulic fluid pressurized by start drive pump 94 to hydraulic start motor 114 until the wet feed electric motor 82 approaches or obtains its operational rated speed at block 223. When wet feed electric motor 82 is rotating at or sufficiently close to its rated speed, control system 70 energizes it by allowing its connection to the electrical power source DoL, as represented by block 225. As represented at block 227, when wet feed drive 80 is on or activated, control system 70 can control the wet feed drive 80 to keep wet feed electric motor 82 energized and operating at its constant rated speed and controls transmission 84 to provide a variable speed driving force that powers the then activated tub feed pump 54. Control system 70 maintains this controlling condition(s) while there is blender demand (block 209) requiring wet additives (blocks 211, 213) such as frac fluid 52 to make slurry 18.

Still referring to FIG. 3, following a determination that additives are need at block 211, block 231 represents an operational state in which dry additives, such as frac sand 34, are needed as constituents to deliver to tub 40 for making slurry 18. Block 233 shows that if the auger drive 38 is not on, then control system 70 determines if auxiliary drive 100 is on or activated and therefore able to power the auger drive 38 at block 235. When the auxiliary drive 100 is not activated with auxiliary electric motor 102 de-energized, then control system 70 determines if motor start drive 90 is activated at block 237 and, if not, activates the motor start drive 90 at block 239 by energizing the start drive electric motor 92. At block 241, control system 70 commands pre-rotation of auxiliary electric motor 102. This includes directing hydraulic fluid pressurized by start drive pump 94 to hydraulic start motor 124 until the auxiliary electric motor 102 approaches or obtains its operational rated speed at block 241. When auxiliary electric motor 102 is rotating at or sufficiently close to its rated speed, control system 70 energizes it by allowing its connection to the electrical power source DoL, as represented by block 243.

When auxiliary drive 100 is on or activated, control system controls the auxiliary drive 100 to keep auxiliary electric motor 102 energized and operating at its constant rated speed and controls auxiliary pump(s) 104 such as hydraulic agitator pump 128, auger drive pump 130, pumping system feed pump 132 and/or their corresponding hydraulically driven motors such as those in agitator drive 48, auger drive 38, or pumping system feed pump 132, to provide the required operational speed(s) of those components.

It is noted that the various auxiliary or other pumps and motors may each be separately controllable, for example, having swashplate or other controllable configurations. In this way, a hydrostatic transmission may be defined within the auxiliary system by the paired variable flow pumps and/or motors to provide variable speed control of components even through the prime mover is operating at a fixed or constant speed. The continued control of auxiliary pumps and motors is represented here at block 245, with the activation of auger drive 38 that powers the screw auger 32 to deliver sand 34 into tub 40. Control system 70 maintains this controlling condition(s) during system demand and use of blender 12, such as mixing and delivering slurry 18 to pumping system 20.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An electrically driven oilfield blender system for preparing a slurry used by an oilfield pressure pumping system that delivers the slurry into a subterranean formation, the blender system comprising:

- a mixing tub that receives multiple constituents of the slurry;
- a mixing tub agitator that mixes the multiple constituents in the tub to prepare the slurry;
- a first electric motor that includes an output section provides power for delivering at least one of the multiple constituents to the mixing tub;

a start motor mounted to the first electric motor output section;

a transmission arranged in a power path between the first electric motor and the mixing tub for selectively delivering power from the first electric motor in a downstream direction; and a second electric motor that communicates with the start motor and delivers power to the first electric motor to pre-rotate the first electric motor independent of the transmission by way of the start motor before the first electric motor is energized so the first electric motor is energized while rotating.

2. The electrically driven oilfield blender of claim 1, further comprising:

an electro-hydraulic motor start system with the second electric motor defining a prime mover of the electro-hydraulic motor start system.

3. The electrically driven oilfield blender of claim 2, the electro-hydraulic motor start system comprising:

a hydraulic pump driven by the second electric motor;

a hydraulic motor that defines the start motor and is driven by the hydraulic pump and mounted to pre-rotate the first electric motor.

4. The electrically driven oilfield blender of claim 3, wherein:

the at least one constituent is a frac fluid;

the first electric motor defines a wet feed electric motor that provides power for delivering the frac fluid into the mixing tub; and the blender further comprises:

a third electric motor that defines an auxiliary electric motor that delivers power to drive at least one of:

a conveying device that delivers at least one of the multiple constituents into the mixing tub;

a pump that delivers the slurry from the mixing tub to the oilfield pressure pumping system; and an agitator drive that rotates blades of the agitator.

5. The electrically driven oilfield blender of claim 4, wherein:

the hydraulic pump defines a hydraulic start pump;

the hydraulic motor defines a first hydraulic start motor mounted for pre-rotating the wet feed electric motor; and the electro-hydraulic motor start system further comprises a second hydraulic start motor and wherein the second hydraulic start motor:

is driven by the hydraulic start pump; and is mounted to pre-rotate the auxiliary electric motor before the auxiliary electric motor is energized so the auxiliary electric motor is energized while rotating.

6. The electrically driven oilfield blender of claim 5, wherein the auxiliary motor includes an auxiliary motor output section and the blender further comprises:

the conveying device that delivers the at least one of the multiple constituents;

the pump that delivers the slurry from the mixing tub to the oilfield pressure pumping system;

the agitator drive that rotates blades of the agitator; and multiple auxiliary pumps mounted to the auxiliary motor output section for hydraulically driving respective ones of:

an auger as the conveying device to deliver frac sand into the mixing tub;

a pumping system feed pump as the pump that delivers the slurry from the mixing tub to the oilfield pressure pumping system; and the agitator drive that rotates the blades of the agitator.

7. An electrically driven oilfield blender system comprising:

a blender mixing system for preparing a frac slurry for use in subterranean fracturing of a geological formation, the electrically driven oilfield blender system including:

a wet additive system providing a frac fluid used to make the frac slurry;

a dry additive system providing frac sand used to make the frac slurry; and a mixing tub that receives and mixes the frac fluid and frac sand to make the frac slurry;

a blender drive system that provides power to the blender mixing system to make the frac slurry, the blender drive system including:

a wet feed drive including a wet feed electric motor that powers a tub feed pump that directs the frac fluid from the wet additive system to the mixing tub;

an auxiliary drive including an auxiliary electric motor that powers an auger that directs the frac sand from the dry additive system to the mixing tub;

a motor start drive including:

a start drive electric motor that powers pre-rotation of each of the wet feed electric motor and the auxiliary electric motor; and a mode selector valve arranged between the motor start drive and each of the wet feed electric motor and the auxiliary electric motor, wherein the mode selector valve is actuatable to selectively deliver power from the motor start drive to each of the wet feed electric motor and the auxiliary electric motor as a function of an operational mode of the electrically driven oilfield blender system.

8. The electrically driven oilfield blender of claim 7, wherein the start drive electric motor pre-rotates each of the wet feed electric motor and the auxiliary electric motor so that:

the wet feed electric motor is rotated before being energized so the wet feed electric motor is energized while rotating; and the auxiliary electric motor is rotated before being energized so the auxiliary electric motor is energized while rotating.

9. The electrically driven oilfield blender of claim 8, wherein each of the wet feed electric motor and the auxiliary electric motor is rotated to its respective rated speed before its energization and is connected to an electrical power source DoL (Direct on Line) during energization.

10. The electrically driven oilfield blender of claim 9, wherein the motor start drive is defined within an electro-hydraulic motor start system, further comprising:

a hydraulic pump that defines a start drive pump that provides hydraulic power that pre-rotates each of the wet feed electric motor and the auxiliary electric motor.

11. The electrically driven oilfield blender of claim 10, the electro-hydraulic motor start system further comprising:

a first hydraulic start motor hydraulically connected to the start drive pump and mounted for pre-rotating the wet feed electric motor; and a second hydraulic start motor hydraulically connected to the start drive pump and mounted for pre-rotating the auxiliary electric motor.

* * * * *